(12) United States Patent
Du

(10) Patent No.: US 9,322,444 B2
(45) Date of Patent: Apr. 26, 2016

(54) HIGH ENERGY VENTILATED CONSTRUCTION BRAKE WITH DUAL DRUM

(71) Applicant: Eaton Corporation, Cleveland, OH (US)

(72) Inventor: Fang Du, Medina, OH (US)

(73) Assignee: EATON CORPORATION, Cleveland, OH (US)

( * ) Notice: Subject to any disclaimer, the term of this patent is extended or adjusted under 35 U.S.C. 154(b) by 0 days.

(21) Appl. No.: 14/276,110

(22) Filed: May 13, 2014

(65) Prior Publication Data

US 2014/0353092 A1    Dec. 4, 2014

Related U.S. Application Data

(60) Provisional application No. 61/828,711, filed on May 30, 2013.

(51) Int. Cl.
| | |
|---|---|
| *F16D 65/12* | (2006.01) |
| *F16D 51/00* | (2006.01) |
| *F16D 55/00* | (2006.01) |
| *F16D 63/00* | (2006.01) |

(52) U.S. Cl.
CPC ............. *F16D 65/128* (2013.01); *F16D 51/00* (2013.01); *F16D 55/00* (2013.01); *F16D 63/004* (2013.01)

(58) Field of Classification Search
CPC ....... F16D 65/128; F16D 51/00; F16D 55/00; F16D 63/004; F16D 2051/001
USPC ............... 188/218 R, 74, 18 A, 71.6, 78, 325, 188/264 A, 77 W, 18 R
See application file for complete search history.

(56) References Cited

U.S. PATENT DOCUMENTS

| 2,284,357 | A | * | 5/1942 | Ash ............................. 188/18 R |
| 3,743,063 | A | * | 7/1973 | Heydenreich et al. .... 188/218 R |
| 8,292,044 | B2 | * | 10/2012 | Simons et al. ............. 188/77 W |
| 2010/0236883 | A1 | * | 9/2010 | Szpak et al. ............... 188/77 W |

* cited by examiner

*Primary Examiner* — Melanie Torres Williams
(74) *Attorney, Agent, or Firm* — Daniel S. Kalka

(57) ABSTRACT

An improved energy capacity brake employing a drum structure with dual braking surfaces may be utilized in a wide variety of industrial and commercial applications requiring braking action. The drum includes first and second annular drum parts joined together to provide a dual drum feature for use with a coupling component together forming a drum brake assembly. In an alternate embodiment the drum may be cast with a single disc member having two braking surfaces.

11 Claims, 2 Drawing Sheets

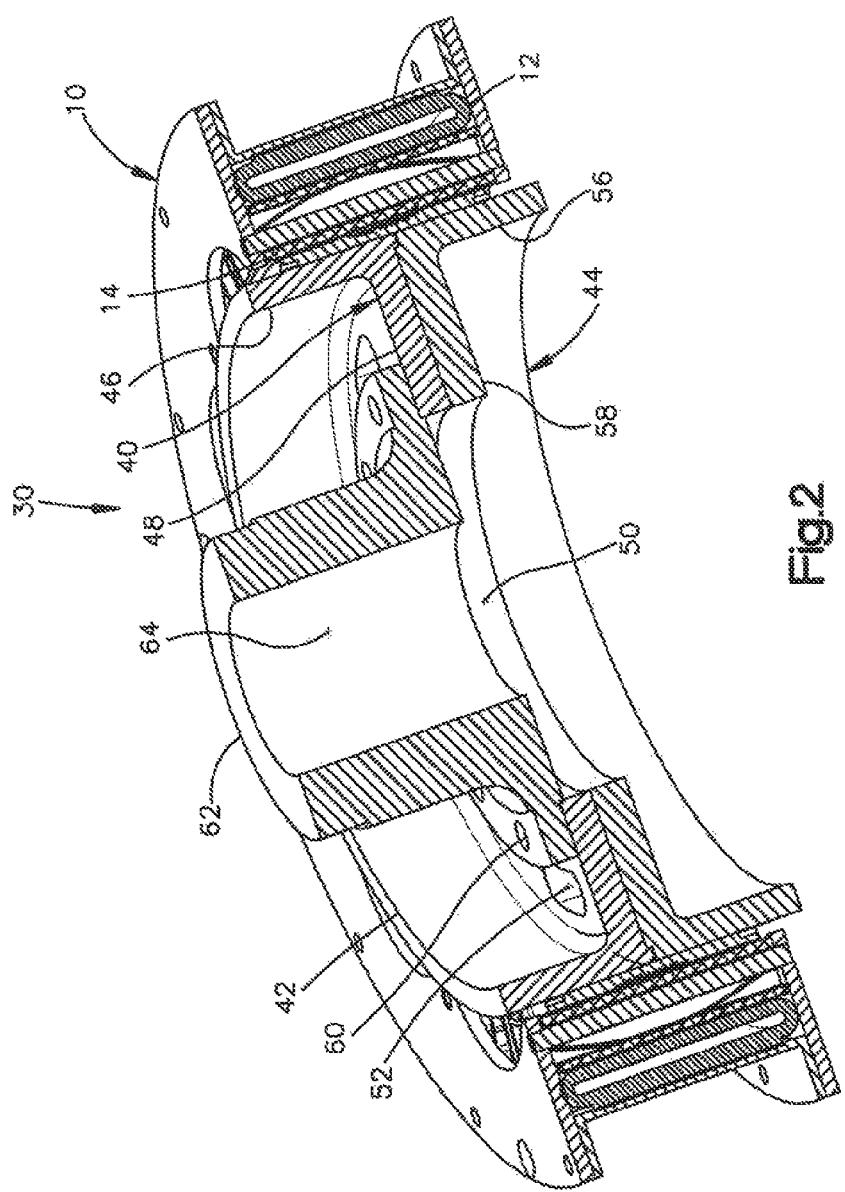

HIGH ENERGY VENTILATED CONSTRUCTION BRAKE WITH DUAL DRUM

CROSS REFERENCE TO RELATED APPLICATION

This application claims benefit pursuant to 35 U.S.C. §119(e) of U.S. Provisional application 61/828,711, filed May 30, 2013, which is herein incorporated by reference in its entirety.

BACKGROUND

The present disclosure relates to an improved energy capacity brake employing a dual drum utilized in a wide variety of industrial and commercial applications requiring braking action, and is particularly suited for high energy applications.

Industrial brakes are employed as an emergency brake or even as a torque limiter, for example, in wind turbines. The brake assembly requires the ability to absorb a significant amount of heat energy and for a long period of time. Heat is generated during the braking action and this heat needs to be dissipated or absorbed in an efficient manner to prolong the life of the brake assembly, a gear box, or a generator in high wind conditions or a grid failure condition. In these types of braking actions requiring large energy capacities, the size of the brake has to be large or else some type of cooling systems required to consume the heat generated during the braking action.

There still exists a need for an improved brake having the capacity to handle the energy from the heat generated during an emergency braking action or torque limiting actions for an application requiring such in order to protect the associated equipment with that application and prolong the life of the brake assembly.

SUMMARY

The present disclosure describes an improved high energy ventilated dual brake drum that may be employed with a drum brake assembly that has utility as a brake or a clutch for applications requiring absorption of heat energy.

The present disclosure discloses an improved drum for a drum brake assembly that includes a first annular drum part having a first base member and a second disc member. The first base member of the first annular drum part extends axially outward in a first direction. The second disc member of the first annular drum part is angularly connected to the first base member of the first annular drum part. The second disc member extends radially inward from the first base member. The first base member has an annular outer surface that is constructed to receive and engage at least a portion of a friction element thereon from a coupling component. The drum also includes a second annular drum part having a first base member and a second disc member. The first base member of the second annular drum part extends axially outward in a direction opposite that of the first base member of the first annular drum part. The second disc member of the second annular drum part is angularly connected to the first base member of the second annular drum part. The second disc member extends radially inward from the first base member at a similar angle to that of the second disc member of the first annular drum part. When the second disc member of the first annular drum part and the second disc member of the second annular drum part are connected, together they form the improved dual brake drum according to the present disclosure.

BRIEF DESCRIPTION OF THE DRAWINGS

FIG. 2 is a perspective elevation view similar to FIG. 2 of the improved high energy ventilated dual drum brake according to the present disclosure.

DETAILED DESCRIPTION

Figure 1:
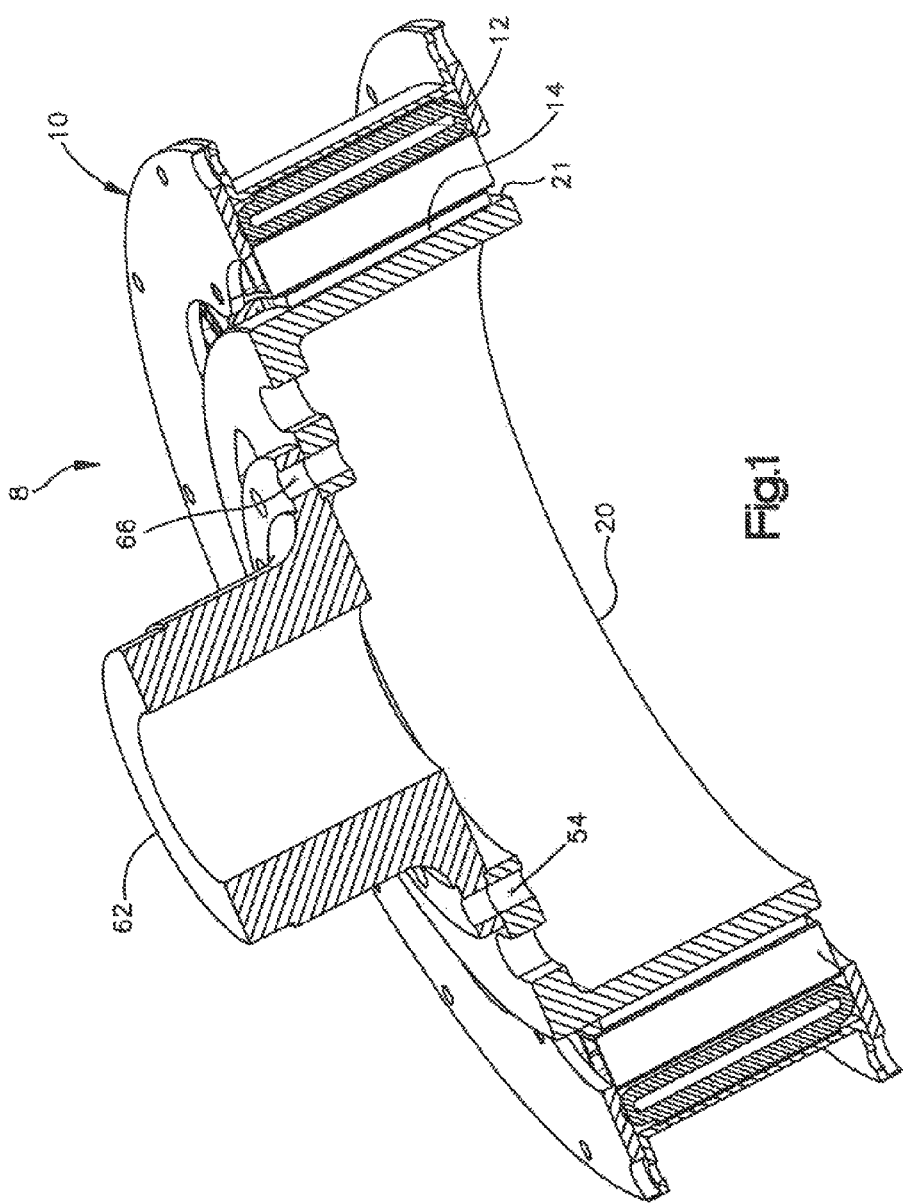
FIG. 1 is a perspective elevation view with a portion omitted depicting a drum brake assembly.

Referring now to the Figures, where like numerals designate like or similar features throughout the several views, and which are not intended to limit the present disclosure, FIG. 1 illustrates a coupling component, generally designated 10, for a drum brake assembly. The term "brake assembly" and "braking action" as used herein is meant to include having the ability to function as a clutch or a clutch assembly. In FIG. 1, the coupling component generally designated 10 may include an inflatable tube 12 and an annular array of friction elements 14 on backing plates. Tube 12 has a generally flattened annular structure. One or more reinforced and/or non-reinforced layers may be disposed in or around tube 12 to enable the coupling component 10 to withstand relatively large torque forces. While a range of elastomers, including thermoset and thermoplastic elastomers, may be used to construct the tube12, thermoplastic elastomers provide a good blend of efficiency and integrity when joining the two ends of the tube 12. A conduit (not shown) directs fluid pressure, for example air pressure, into the annular tube 12 causing the tube 12 to expand radially inwardly for engaging the plurality of friction elements14 against the drum 20.

Upon inflation, tube 12 expands causing friction elements 14 to constrict radially inwardly causing the radially inner surfaces of the friction elements 14 to frictionally engage an outer surface 21 of drum 20. The friction between the friction elements 14 and the drum 20 couple the drum 20 and the coupling component 10 together to form the drum brake assembly generally designated 8 as seen in FIG. 1. The resulting torque forces may retard or stop the motion of the drum 20 resulting in the generation of heat energy. When brake assemblies are used as emergency brakes or torque limiters, for example in wind turbines or other high energy applications, the brake assembly needs to absorb or dissipate this generated heat energy for a fairly long period of time to protect the gear box and generator during high wind conditions or in the event of a grid failure or simply due to the application. An advantage of the brake assembly of the present disclosure is its ability to act as a heat sink and absorb this heat energy without the need to build a huge brake assembly. In many instances where a brake assembly needs to be used in high heat energy applications the brake assembly's size is dramatically increased for the torque. As a result this also increases the space requirement and cost. If flowing water or another fluid is used to cool the brake assembly, the additional power source, pump, valves, and conduits add tremendously to the cost and size requirements.

While the single drum 20 shown in FIG. 1 has found use in the industry, it is limited in its ability to absorb heat energy and its applications. The improved ventilated dual brake drum 40 of the present disclosure increases thermal capacity and service ability. The configuration of the dual brake drum 40 increases heat sink by increasing mass support in the middle of the drum and its ventilating characteristics.

In FIG. 2, there is depicted the improved ventilated dual brake drum 40 according to the present disclosure in position within a coupling component 10 together forming an improved drum brake assembly generally designated 30. Drum 40 comprises a first annular drum part 42 and a second annular drum part 44. The first annular drum part 42 includes a first base member 46 and a first disc member 48. The first base member 46 is attached to the first disc member 48 in a manner that projects the first base member 46 substantially at a right angle from the first disc member 48. That is the first base member 46 extends axially away from the first disc member 48. The first disc member 48 extends radially inward as seen in FIG. 2. The first disc member 48 includes a centrally located opening 50 for receiving a shaft or other component requiring braking from a workpiece (not shown). First disc member 48 also may include a plurality of ventilating apertures 52 and passages 54 which may be used for connection to a hub 62 with fasteners 60.

The second annular drum part 44 likewise includes a second base member 56 and a second disc member 58 joined together in a similar manner as that of the first base member 46 and first disc member 48 except that the second base member 56 of the second annular drum part 44 is axially oriented in an opposite direction to that of first base member 46 of the first annular drum part 42. The second disc member 58 of the second annular drum part 44 includes a centrally located opening 50 that is concentric with that of the first disc member 48 of the first annular drum part 42. The second disc member 58 further includes ventilating apertures 52 and passages 54 that may be concentric with those of the first disc member 48.

The first annular drum part 42 may be attached to the second annular drum part 44 with a plurality of fasteners 60 through passages 54. Alternatively, the two drum parts 42, 44 may be joined together by welding or other suitable means, or cast as a single unit. Together the two disc members 48, 58 may include the hub 62 having a centrally located opening 64 that may be concentric with opening 50 and may be attached to the hub 62 with fasteners 60 through a plurality of holes 66 in the hub that are coincident with the passages 54, or in any other suitable manner.

The drum 40 and its first and second annular drum parts 42, 44 are made of a metal, like iron, steel or a metal alloy or other suitable material for the desired application. The braking surface of the drum 40, that is the first and second base members 46, 56 may include special treatment such as coating or implantation of hardening metals or ceramics or cladding with a wear resistant material. Drum 40 may also include friction shield elements on its outer surface of the first and second base members 46, 56.

Upon inflation of the annular tube 12 with a suitable fluid, like air, the annular tube 12 causes friction elements 14 to move radially inwardly, or to constrict against the outer surface of the first base member 46 of the first annular drum part 42 and the first base member 56 of the second annular drum part 44, respectively, for the braking action. Together the outer surfaces of the base members 46, 56 form the braking surface of the drum 40.

While the drum has been described as including first and second annular drum parts 42, 44, it should be immediately apparent that the drum of the present disclosure may be cast as a single unit with a single disc member 48' and two base members 46, 56 extending in opposite directions. This embodiment is similar to that depicted in FIG. 2 with the exception that there would only be a single disc member 48' rather than the first and second disc members 48, 58 as shown.

The exemplary embodiments have been described with reference to the present practice. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

I claim:

1. An improved drum for a drum brake assembly, comprising:
   a first annular drum part having a first base member and a first disc member, said first base member of said first annular drum part being connected to said first disc member in a manner that projects said first base member substantially at a right angle from the first disc member, said first base member having an annular outer surface, said outer surface of said first base member of said first annular drum part being constructed to receive and engage a friction element from a single coupling component;
   a second annular drum part having a second base member and a second disc member, said second base member of said second annular drum part being connected to said second disc member in a manner that projects the second base member substantially at a right angle from the second disc member, said second base member of said second annular drum part being axially oriented in an opposite direction to that of said first base member of said first annular drum part, said second base member having an annular outer surface constructed for receiving and engaging a friction element of said single coupling component; and
   said first disc member of said first annular drum part and said second disc member of second annular drum part being connected to each other to form one drum for a coupling component.

2. The drum as defined in claim 1, wherein said first disc member of said first annular drum part and said second disc member of said second annular drum part each contain a plurality of openings for ventilating the drum.

3. The drum as defined in claim 1, wherein said first and second disc members of said first and second annular drum parts are connected together with fasteners.

4. The drum as defined in claim 3, further comprising a hub attached with fasteners to said connected first and second disc members of said first and second annular drum parts.

5. The drum as defined in claim 1, wherein said first and second disc members are joined by welding the first and second disc members together.

6. An improved constricting drum brake assembly, comprising:
   a coupling component having a plurality of friction elements operable to constrict radially inward upon receiving a fluid pressure; and
   a drum disposed for rotary movement constructed to be received and engaged within said coupling component for providing a braking action, said drum having a first annular drum part having a first base member and a first disc member, said first disc member having a centrally located opening, said first base member of said first annular drum part being connected to said first disc member in a manner that projects said first base member substantially at a right angle from the first disc member, said first base member having an annular outer surface, said outer surface of said first base member of said first annular drum part being constructed to receive and engage said friction elements from said coupling component, said drum further having a second annular drum part having a second base member and a second disc member, said second disc member having a centrally located opening, said second base member of said second annular drum part being connected to said second disc member in a manner that projects said second base member, substantially at a right angle from the second disc member, said second base member of said second annular drum part projecting in an opposite direction to that of said first base member of said first annular drum part, said second base member of said second annular drum part being constructed to receive and engage said friction elements within said same coupling component as said first base member of said first annular drum part; and, said first disc member of said first annular drum part and said second disc member of second annular drum part being joined to each other such that said centrally located openings of said first and second disc member are concentric and form said drum.

7. The brake drum assembly as defined in claim 6, further comprising a centrally located hub attached to said joined first and second disc members of said first and second annular drum parts.

8. The brake drum assembly as defined in claim 6, wherein said first and second disc members of said first and second annular drum parts include a plurality of appertures for cooling.

9. The brake drum assembly as defined in claim 6, wherein said first and second disc members of said first and second annular drum parts include a plurality of openings for receiving fasteners to join the first and second disc members together.

10. The brake drum assembly as defined in claim 6, wherein said first and second disc members of said first and second annular drum parts are joined together by welding.

11. An improved constricting drum brake assembly, comprising:
  a coupling component having a plurality of friction elements operable to constrict radially inward upon receiving a fluid pressure; and
  a drum disposed for rotary movement constructed to be received and engaged within said coupling component for providing a braking action, said drum having a first base member and a disc member, said first base member of said drum extending axially outward in a first direction, said disc member being angularly connected to said first base member at substantially a right angle and extending radially inward from said first base member, said first base member having an annular outer surface, said outer surface of said first base member being constructed to receive and engage at least a portion of said friction element from said coupling component,
  said drum further having a second base member, said disc member being angularly connected to said second base member at substantially a right angle, said second base member extending axially outward in a direction opposite that of said first base member, said second base member being constructed to receive and engage at least a portion of said friction element thereon from said coupling component,
  wherein said first and second base members of the drum together form the braking surface of the drum within said coupling component.

* * * * *